June 16, 1936. J. F. WEBSTER 2,044,376
ANIMAL FOOD PROCESSING MACHINE
Filed Feb. 25, 1935 4 Sheets-Sheet 3

JESSE F. WEBSTER
INVENTOR

ATTORNEY

June 16, 1936.  J. F. WEBSTER  2,044,376
ANIMAL FOOD PROCESSING MACHINE
Filed Feb. 25, 1935  4 Sheets-Sheet 4

JESSE F. WEBSTER
INVENTOR

ATTORNEY

Patented June 16, 1936

2,044,376

UNITED STATES PATENT OFFICE 2,044,376

ANIMAL FOOD PROCESSING MACHINE

Jesse F. Webster, Portland, Oreg.

Application February 25, 1935, Serial No. 8,223

6 Claims. (Cl. 107—8)

My invention relates to improvements in processing machines and particularly for the processing of stock food in which a die holder having a perforated die disposed therein is reciprocated in a predetermined path within the frame of the device. Feed rollers are mounted transversely of the machine and extrude the material through the perforated plate as the die holder and plate are reciprocated. The extruded material is cut by knives that work in close proximity and in intimate engagement with the underside of the perforated plate. The materials to be processed are submitted and agitated to the action of live steam before being deposited in a uniform layer upon the perforated plate.

The primary object of my invention is to provide a simply constructed machine that may be used in the compressing of steamed food into pellets of uniform length and the delivering of the same into a receiving hopper through the action of gravity.

A further object of my invention consists in providing a device that may be operated continuously and through the use of which admixtures of animal food may be compressed into pellets or units that are uniform in length and through the use of which the animal may be fed a balanced ration that must be masticated while being eaten and to feed the same in a form to the animal, that does not permit selective eating of the preferred food elements on the part of the animal eating the same.

A still further object of my invention consists in first delivering the finely communicated food into a chest where the same is entirely agitated in the presence of live steam and thereafter where uniform layers of the material are deposited upon a perforated plate and which is then extruded through the holes of the perforated plate under sufficient pressure to form the food into pellets of substantial density. The holes through which the material is to be forced are of sufficient length to create very substantial resistance to the forcing of the finely comminuted steamed material therethrough so that when the product emerges from the holes through which the same is extruded it will maintain its shape, form and density until delivered as a ration to the animal to which it is to be fed.

I provide cushioning supports for the rollers to thereby give the machine a factor of safety to prevent its destruction in the event of tramp iron or other hard substances being deposited upon the roller.

And a still further object of my invention consists in so constructing the die holder and die that the die may be changed with a minimum of chute down to the machine upon which the same is to be used.

I am aware that heretofore circular discs have been used for this purpose and that the material to be condensed is forced through spaced holes in the disc through a compression generated within the mass by screw action, also that circular discs have been used in which conical rollers are used in the forcing of the material through the perforated die. In both of these methods great frictional losses are encountered.

Through the use of my new and improved device the material is forced through the perforated die by cylindrical rollers that are brought into intimate contact with the comminuted steamed mass so that the only frictional loss is that of the machine operation and the friction created by the extruding of the mass through the perforated holes disposed within the perforated plates.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 1:
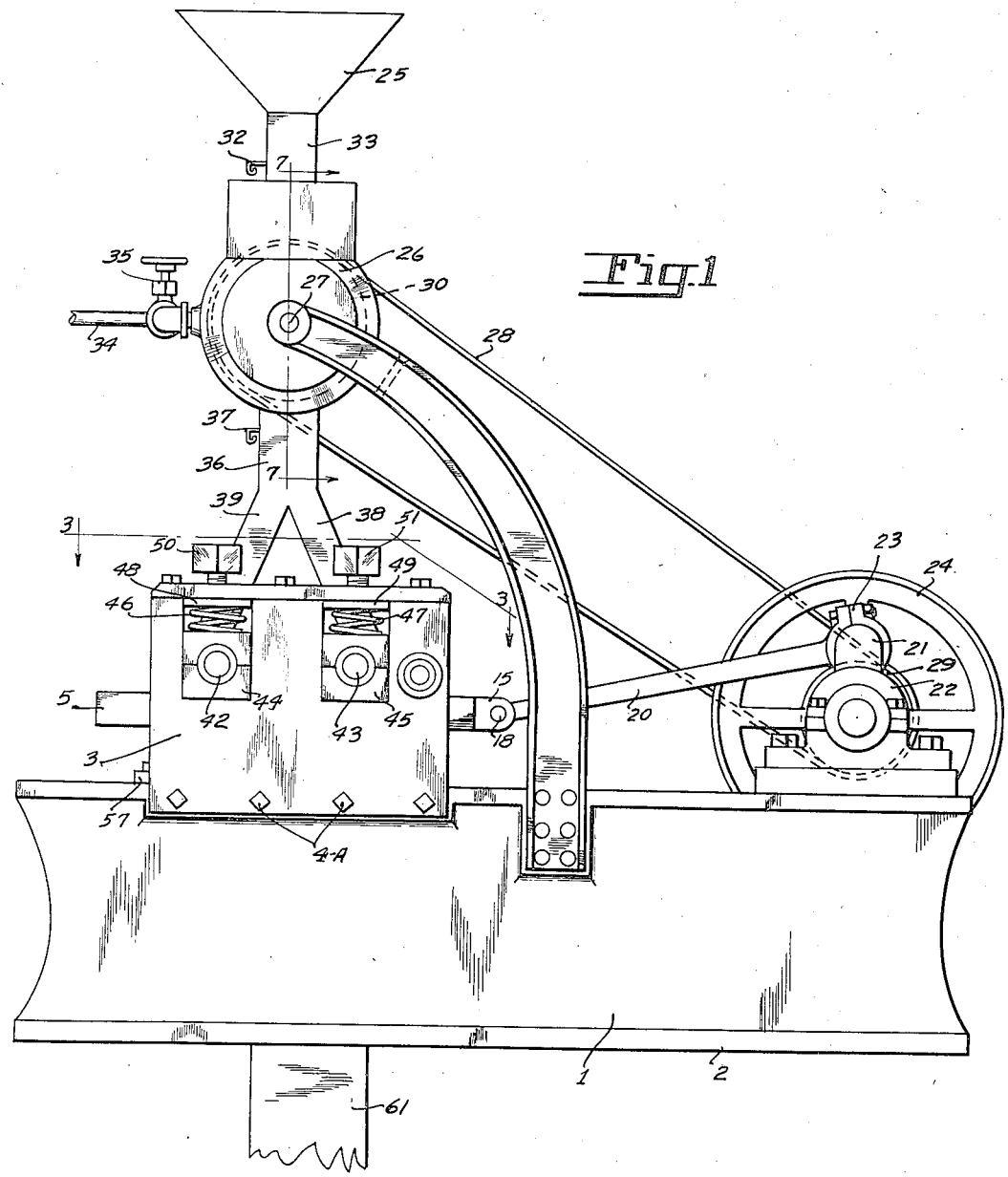
Fig. 1 is a side view of my assembled device.

I preferably make my machine having a substantially built fabricated frame 1. The frame 1 has a base ledge 2 extending therearound through which suitable fastening and holding down bolts may be made to pass to secure the same to any suitable support. A feeding hopper or chest 3 is secured to the oppositely disposed sides of the top of the frame 1 and is secured thereto by any suitable fastening means as through the use of set screws 4. The frame has a reciprocating die holder 5 disposed thereupon. The die holder to be reciprocated is maintained in alignment by guide members 6 and 7 that are disposed at the oppositely disposed sides of the die holder and the same may be formed integral with the frame or be removably secured thereto. The die holder has a die 8 disposed therein. The die holder has guideways disposed at the upper side of its inner edges 9 and 10 and the die has ledges 11 and 12 outwardly extending that engage within the guideways. These ledges support the die and permit the longitudinal movement of the die to permit its removal from the die holder and its replacement therein. The die holder has pairs of spaced lugs 13 and 14 and 15 and 16 that rearwardly extend from the die holder. Wrist pins 17 and 18 pass therethrough and connecting rods 19 and 20 connect the wrist pins with the crank shaft 21. The crank shaft 21 is journaled within suitable journal bearings 22 that are disposed upon the rear end and at the top side of the frame 1. The connecting rods are secured to the crank shaft in the usual manner through the use of split bearings 23.

Because of the character of the work to be done by the machine I have found that a relatively heavy fly wheel 24 should be secured to the crank shaft 21. The fly wheel 24 may also act as the driving wheel to which the belt or other driving mechanism that may be attached to the prime mover, not here shown, is used for driving the same. I recommend the use of V belts or roller chain for driving the machine depending upon the location of the same and the speed to which it is to be driven.

The material to be processed is delivered into a feeding hopper 25. The feeding hopper 25 receives material to be processed from a source of supply not here shown, and the same is delivered into the chest 26. The chest 26 has a shaft 27 running longitudinally thereof and the same is rotated by any suitable driving means as through the use of a belt 28 that is trained about driving pulley 29 disposed upon the crank shaft 21 and about a driving pulley 30.

Any suitable agitating spider 31 is disposed in the chest and removably secured to the shaft 27. A stop 32 is disposed within the chute 33 that connects the hopper 25 with the chest 26.

In the processing of materials commonly used for this purpose best results are to be obtained where live steam is admitted into the chest during the agitation of the same and before the same is delivered to the feed rollers. A pipe 34 delivers live steam, from a source of supply not here shown, into the chest and the amount of steam to be admitted is regulated by a valve 35 that is disposed within the steam line 34.

The materials are delivered from the chest 26 to the feed rollers through a chute 36 and a sliding stop 37 is disposed within the chute and regulates the flow of the material therethrough. The lower end of the chute 36 is bifurcated so that legs 38 and 39 deliver the material to be processed at each side of the feed rollers 40 and 41. The feed rollers 40 and 41 are mounted respectively upon the shafts 42 and 43. The shafts 42 and 43 are journaled upon their respective ends in set of journal bearings 44 and 45.

In order to provide a safety against tramp iron and at the same time to predetermine the amount of pressure that may be developed upon the feed being processed I provide cushioning means as coil springs 46 and 47 at the top of each of the pairs of bearings that act as bearings for the respective feed roller shafts. Plates 48 and 49 are disposed at the top of the cushioning springs and the amount of pressure to be applied to the springs is determined by the position of screws 50 and 51 that are in threaded relation with the top of the side frames when the desired pressure is obtained the set screws are held in position by lock nuts 52 and 53.

The die holder rests directly upon roller supports 54 and 55 and the underside of the die holder is made true and smooth in order that the die holder may be reciprocated thereover in precise alignment. The pairs of shafts 56 upon which the rollers 54 and 55 are mounted are journaled within any suitable anti-friction bearings 57 and 58. These bearings rest directly upon the frame of the machine and are secured thereto by set screws 59 and 60.

A receiving chute 61 is disposed below the perforated die plate into which the cut material descends when severed at the underside of the die plate by the cutting knives that engage the underside of the die plate.

I have here shown knives as being four in number and illustrated at 62, 63, 64 and 65. Each of the cutting knives has a pair of stems 66 that downwardly extend therefrom. Supporting brackets 67, 68, 69 and 70 are secured at the oppositely disposed sides of the frame and the stems 66 of the knives pass through the bracket and are supported thereby.

In order that a tight working relation may be maintained between the knives and the underside of the perforated die plate a reactance means as a coil spring 71 is disposed about the stems and rests against the underside of the knife blade on its one end and upon the bracket on its other end. I recommend that these blades be placed equi-distant from the center line of the feed roller and at each side thereof. The brackets are secured to the side frame by any suitable fastening means. The stems 66 of the knives are removable from the brackets to facilitate the reconditioning of the knives. Pins 66A extend through the stems 66 and prevent the knives disengaging from the brackets when the die plate is removed. A secondary hopper 72 encompasses the feed rollers and that portion of the device disposed therearound, the purpose of which is to maintain delivered materials to be processed upon the die plate.

The bifurcated sections 38 and 39 of the feeding chute deliver the processed materials immediately above the feed rollers 40 and 41 and the deposited material gravitates to each side of each of the feed rollers. A hood is disposed above each of the feed rollers and the feeding head has hinged wings 73 and 74. Bracket arms 75 and 76 are secured upon their respective outer ends to the frame of the head assembly and supporting bars 77 and 78 are disposed upon the inner ends of each of these arms. End plates 79 and 80 are secured to the opposite ends of the bars 77 and 78. Hinge pins 81 and 82 are rockably secured to the respective plates and the wings 73 and 74 are secured to the respective hinge pins.

Figure 2:
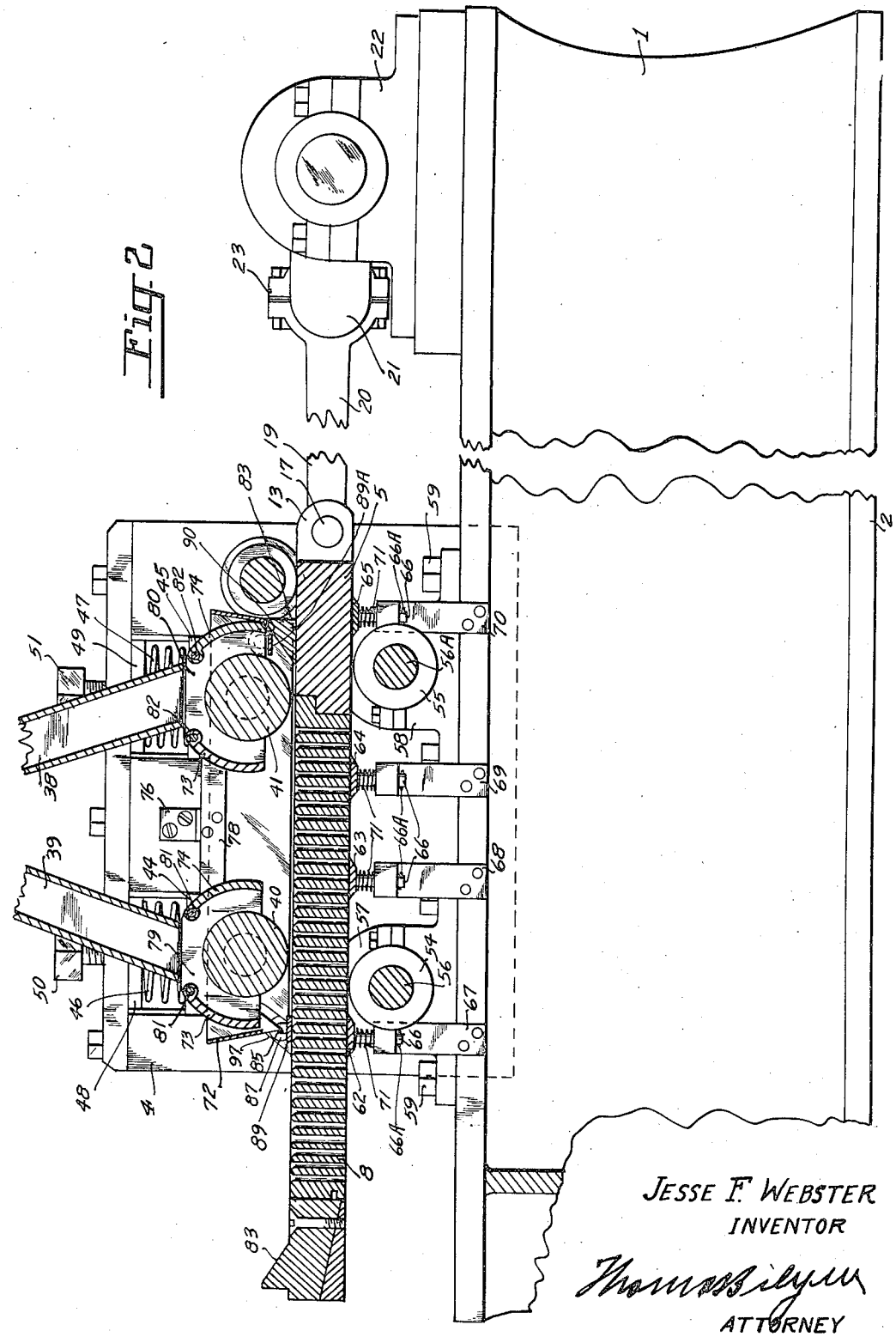
Fig. 2 is a fragmentary, sectional side view of the body portion of the machine and the related parts.
Figure 3:
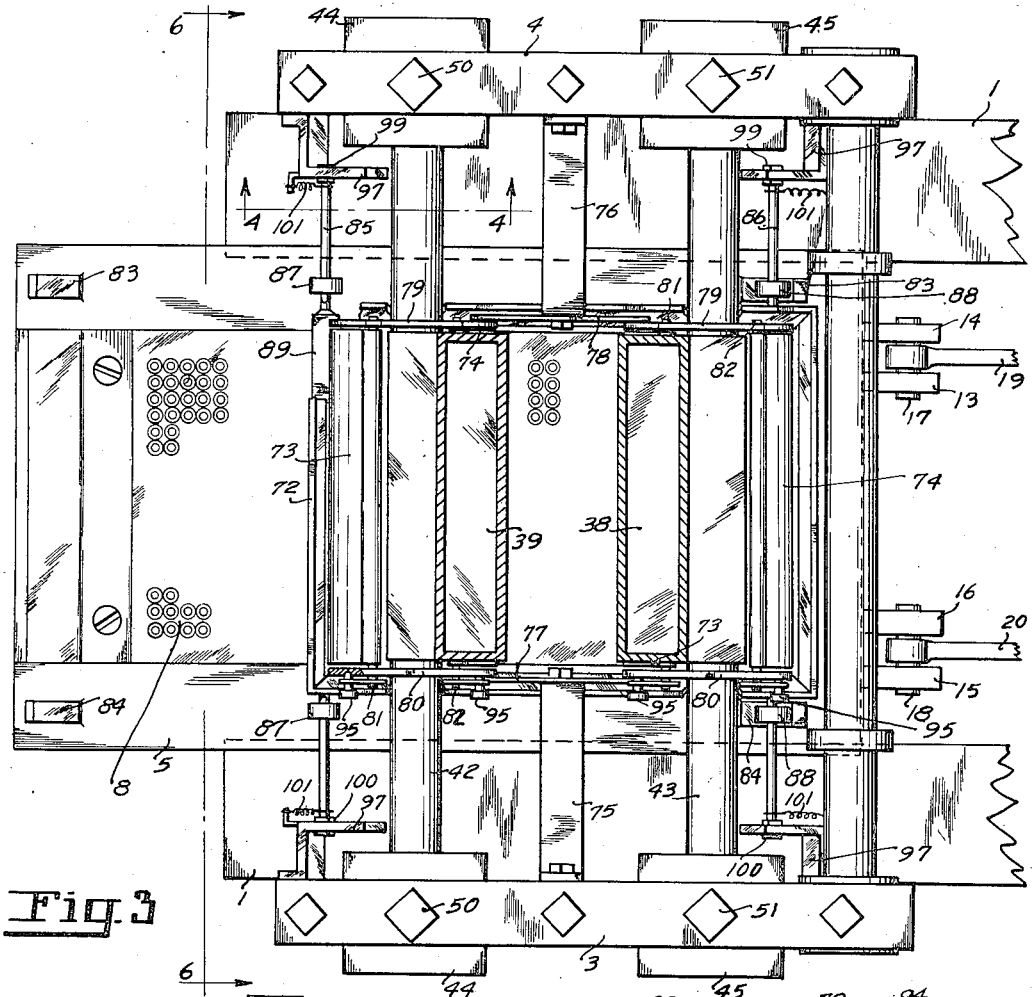
Fig. 3 is a fragmentary, sectional plan view of the feed rollers and of the related parts. This view is taken on line 3—3 of Fig. 1, looking in the direction indicated.

In order to prevent the piling up of material at the outside of the feed rollers at the extreme end movement of the die holder and die plate I provide a means of cutting off delivery of materials to the die plate. To accomplish this result I place a pair of camming surfaces 83 and 84 adjacent the ends of the die holder. Crank shafts 85 and 86 are disposed transversely of the frame of the machine and pairs of rollers 87 and 88 are disposed upon these crank shafts. The rollers 87 and 88 are placed in registerable alignment with the upwardly extending camming surfaces 83 and 84 and cut off blades 89 and 89A are carried by the shafts 85 and 86 respectively and as the camming surfaces engage the rollers the blade is raised into the position shown in Fig. 2 at 90 to thereby stop the flow of material at the outside of the feed roller 41. In the reverse travel of the die and die holder the cut off blade 89 is raised to stop the flow of materials at the outside of the feed roller 40. It will be seen that this is accomplished by the rollers 87 engaging the cams 83 and 84.

It is essential in the operation of machines of this type to furnish pellets of different diameters. In the processing of baby chick food the holes in the perforated plate are small. In the processing of food for laying hens the pellets are made larger in diameter whereas the processing of food for cattle requires pellets of still larger diameter. The size of the holes through which the material is to be extruded determines the thickness of the sheet of prepared material that is to be deposited upon the perforated plate and at either side of the feed rollers. To determine the thickness of the sheet to be deposited thereupon is the purpose and object in placing the pairs of hinged wings 73 and 74.

Figure 5:
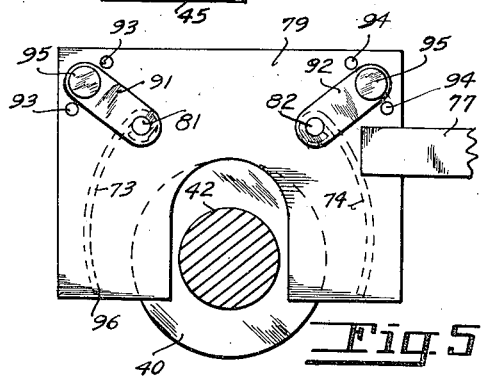
Fig. 5 is a fragmentary, sectional end view of one of the chests upon which the feed rollers are mounted and is made to illustrate wings that are disposed at the discharge end of the feeding spouts.
Figure 6:
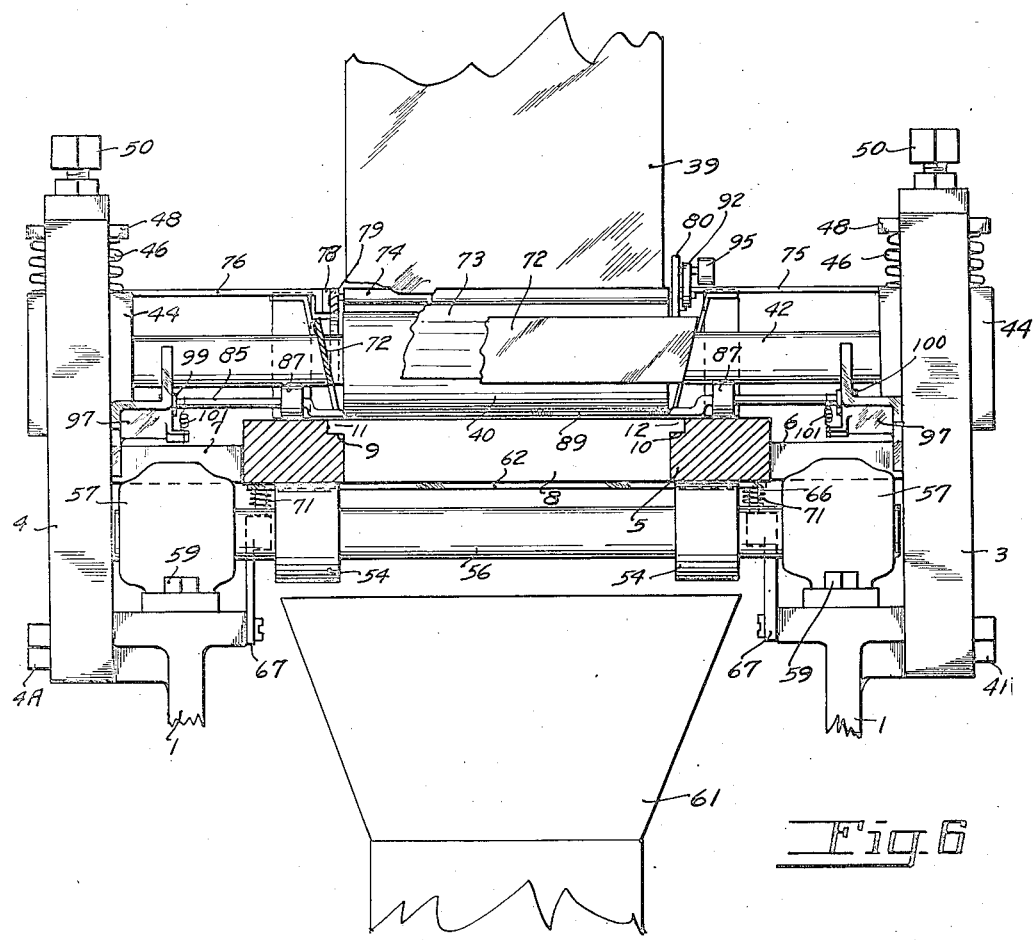
Fig. 6 is a sectional end view of the feed rollers and of the pressure plate through which the material is to be extruded. This view is taken on line 6—6 of Fig. 3, looking in the direction indicated.
Figure 7:
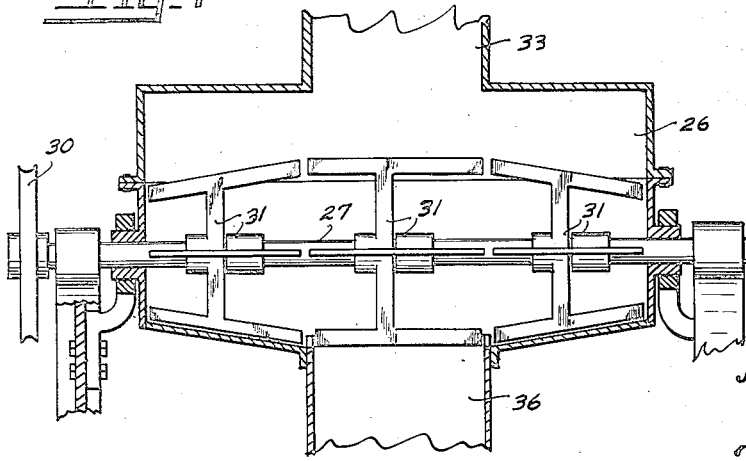
Fig. 7 is a sectional front view of the steam chest through which the material passes from a source of supply to the feed rollers. This view is taken on line 7—7 of Fig. 1, looking in the direction indicated.

Referring to Fig. 5. Arms 91 and 92 are secured to the hinge pins 81 and 82 and the wings 73 and 74 are fixed relative to the shaft so that as the shaft is rocked the wings will also be moved toward or away from the respective feed rollers. A plurality of spaced holes 93 and 94 are formed within the plate 80 and a spring actuated locking pin 95 is carried by the arm and is positioned to engage within spaced holes 93. The positioning of the arm places the end 96 of the wing in spaced relation with the feed roller and predetermines the thickness of the sheet of material that is to be deposited upon the perforated plate.

Figure 4:
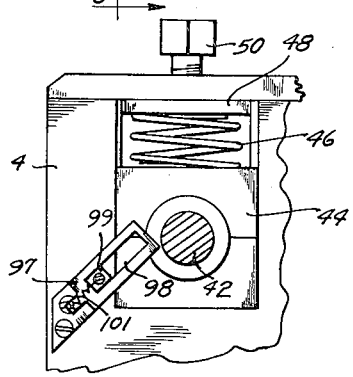
Fig. 4 is a fragmentary, sectional side view of the bearing and the compensating regulating bar. This view is taken on line 4—4 of Fig. 3, looking in the direction indicated.

In Fig. 4 is illustrated the manner in which the cut off blades 89 and 89A are guided. Brackets 97 are secured to the side frame of the device and outset from the frame. A slot 98 is disposed within the outset portion. Blocks 99 and 100 are secured to each end of the shafts 85 and 86 and intimately engage within the slot 98. Springs 101 are secured upon their one end to the shafts 85 and 86 and upon their other end to the brackets 97. It will be seen that due to the inclination of the slot 98, when the cams 83 and 84 pass from beneath the rollers 87 the blade 89 will return to the top surface of the die plate and will not be directly beneath the opening beneath the roller 40 and the wing 73.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a frame, a crank shaft journaled relative to the frame, means for driving the crank shaft, a die holder reciprocably disposed within the frame, guides for said die holder, a connecting rod connecting the crank shaft with the die holder, a perforated die removably disposed within the die holder, feeding rollers and means for delivering materials to be compressed upon the die plate and for being extruded through the die plate at either side of each of the feed rollers.

2. In a device of the class described, the combination of a frame, a power driven crank shaft journaled relative to the frame, guideways disposed longitudinally of the frame, a die holder reciprocably disposed within the guideways, a connecting rod disposed between the die holder and the crank shaft, feed rollers disposed transversely of the die holder and die, cushioning means for journaling the feed rollers, means for delivering steamed materials upon the die plate and a delivery chute disposed beneath the die holder and die plate.

3. In a device of the class described, the combination of a frame, a die holder and a perforated die plate reciprocably associated with the frame, power means for reciprocating the die holder and the die plate, feed rollers journaled relative to the frame, means for delivering steamed material upon the die plate, means for cutting materials being extruded through the perforated die plate and a delivery chute disposed below the cutting device.

4. In a device of the class described, in combination, a frame, a driven crank shaft journaled relative to the frame, a perforated die plate disposed within the frame, means for reciprocating the die plate in a predetermined path longitudinally of the frame, means for delivering heated treated materials upon the perforated plate, roller means journaled within the frame for forcing the delivered materials through the die plate when the plate is reciprocated and means for cutting the extruded materials to length.

5. In a device of the class described, in combination, a structural frame, a plate having spaced holes disposed vertically therethrough reciprocably disposed within the frame, means for reciprocating the plate, feed rollers disposed transversely of the frame and perforated plate and journaled within the frame, means for feeding mixed processed materials upon the perforated plate and a plurality of knives engaging the underside of the perforated plate.

6. In a device of the class described, in combination, a base frame, a rectangular perforated plate having a plurality of spaced holes extending vertically through the plate, means for imparting a to and fro movement to the plate and within a predetermined path within the frame, feed rollers disposed above the plate, means for feeding prepared materials upon the plate and at either side of each of the feed rollers and a plurality of cutting knives disposed on the underside of the perforated plate and in contact with the underside of the perforated plate.

JESSE F. WEBSTER.